(12) United States Patent
Seki et al.

(10) Patent No.: US 7,314,540 B2
(45) Date of Patent: Jan. 1, 2008

(54) DIAMOND-COATED ELECTRODE AND METHOD FOR PRODUCING SAME

(75) Inventors: Yuichiro Seki, Itami (JP); Kenji Izumi, Itami (JP); Takahiro Imai, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 159 days.

(21) Appl. No.: 10/547,381

(22) PCT Filed: May 25, 2004

(86) PCT No.: PCT/JP2004/007102

§ 371 (c)(1),
(2), (4) Date: Aug. 29, 2005

(87) PCT Pub. No.: WO2004/104272

PCT Pub. Date: Dec. 2, 2004

(65) Prior Publication Data

US 2006/0144702 A1    Jul. 6, 2006

(30) Foreign Application Priority Data

| May 26, 2003 | (JP) | ............................. 2003-147055 |
| Oct. 29, 2003 | (JP) | ............................. 2003-369534 |
| Nov. 5, 2003 | (JP) | ............................. 2003-375771 |
| Feb. 6, 2004 | (JP) | ............................. 2004-030301 |

(51) Int. Cl.
   *C25B 11/12*    (2006.01)
(52) U.S. Cl. .................. 204/294; 502/101; 502/174; 423/446; 427/78; 427/122; 427/249.1; 427/249.5; 427/249.8; 427/577; 427/590
(58) Field of Classification Search ............... 204/294; 205/759, 760; 502/101, 174; 423/446; 427/78, 427/122, 249.1, 249.5, 249.8, 577, 590
See application file for complete search history.

(56) References Cited

U.S. PATENT DOCUMENTS 5,399,247 A * 3/1995 Carey et al. ............... 205/688

(Continued)

FOREIGN PATENT DOCUMENTS

JP    9-13188    1/1997

(Continued)

OTHER PUBLICATIONS

Ferreira, et al., "Electrochemical Characterization on Semiconductors p-Type CVD Diamond Electrodes," Brazilian Journal of Physics, Dec. 1999, pp. 760-763, vol. 29, No. 4.

(Continued)

*Primary Examiner*—Bruce F. Bell
(74) *Attorney, Agent, or Firm*—McDermott Will & Emery LLP (57) ABSTRACT

A diamond electrode having a sufficiently low resistance is disclosed which is realized by increasing the amount of boron added thereto. A method for producing a high-performance, high-durability electrode is also disclosed by which adhesiveness between a diamond coating and a substrate and separation resistance during electrolysis are sufficiently increased. An electrode composed of a substrate and a diamond layer coating the substrate is characterized in that the electrode is composed of a base coated with diamond and the diamond contains boron in such an amount that the boron concentration is not less than 10,000 ppm but not more than 100,000 ppm. The base is preferably made of an insulating material.

25 Claims, 4 Drawing Sheets

U.S. PATENT DOCUMENTS

| | | |
|---|---|---|
| 5,776,323 A | 7/1998 | Kobashi |
| 5,900,127 A | 5/1999 | Iida et al. |
| 6,375,827 B1 * | 4/2002 | Kurosu et al. .............. 205/687 |
| 6,533,916 B1 | 3/2003 | Puetter et al. |
| 6,582,513 B1 * | 6/2003 | Linares et al. ................ 117/93 |

FOREIGN PATENT DOCUMENTS

| | | |
|---|---|---|
| JP | 9-268395 | 10/1997 |
| JP | 11-269685 | 10/1999 |
| JP | 2000-204492 | 7/2000 |
| JP | 2000-313982 A | 11/2000 |
| JP | 2001-147211 A | 5/2001 |
| JP | 2004-231983 A | 8/2004 |

OTHER PUBLICATIONS

Supplementary European Search Report issued in corresponding European Patent Application No. EP 04 73 4725, dated Nov. 10, 2006.

Kurosu, T., et al. "Fundamental electrolytic properties of boron-doped diamond anode" Preprints of the 26th committee of Electrolytic Science Technology, Committee of Soda Technology, Nov. 28, 2002.

* cited by examiner

DIAMOND-COATED ELECTRODE AND METHOD FOR PRODUCING SAME

BACKGROUND ART

Diamond by vapor phase synthesis is known as a way to obtain polycrystalline diamond with a relatively large surface area less expensively than natural diamond or manmade monocrystalline diamond obtained under ultra-high pressure, and such diamond is utilized in optical component applications and as heat sinks for electronic components and tools. Known film formation methods include microwave plasma CVD, hot filament CVD, DC arc jet plasma CVD, and so forth. Diamond obtained by these methods usually exhibits electrically insulating property, but can be rendered conductive by doping impurities during the film formation. Such conductive diamond has for some time been the subject of research and development in semiconductor and electronic component applications, particularly in the growth of monocrystalline diamond in the vapor phase, but imparting conductivity to polycrystalline diamond produced by vapor phase synthesis has been attracting particular attention in recent years because of its potential for use as water treatment electrodes.

In order to treat large quantities of water, diamond electrodes used for water treatment are used in a state in which a large electric current is sent to large electrodes. Therefore, to improve the efficiency of the treatment, it is important for the electrical resistance of the diamond layer, which is the outermost surface of the electrode, to be low.

The most widely known method for producing polycrystalline conductive diamond for electrodes in water treatment is to dope boron during film formation by microwave plasma CVD or hot filament CVD.

Many different methods are known to dope boron during film formation, of which the followings are specific examples.

Japanese Patent Publication 2001-147211 discloses an invention relating to a method for measuring stably and at high sensitivity the amount of uric acid in a liquid measured by using a diamond thin-film electrode that has been anodized. Here, in the manufacture of a diamond thin film by microwave plasma CVD, boron oxide ($B_2O_3$) is dissolved in a mixture of acetone and methanol, this solution is introduced into an apparatus using $H_2$ gas as a carrier gas, and a film is formed.

Japanese Patent Publication H9-13188 described, in relation to a diamond electrode in which at least part of the electrode is composed of a semiconductor diamond film, wherein diborane ($B_2H_6$) diluted with hydrogen is used as a raw material gas to form a diamond film by microwave plasma CVD.

Japanese Patent Publication 2000-313982 relates to an electrode produced by forming a diamond layer on a substrate, wherein boron is doped in the diamond by using trimethyl borate ($B(OCH_3)_3$) as the boron source in the formation of the diamond layer by hot wire CVD (hot filament CVD), and the boron content is from 10 to 10,000 ppm, and preferably 10 to 2000 ppm, and even more preferably 5 to 1000 ppm.

The publication "Preprints of the 26th Committee of Electrolytic Science Technology, Committee of Soda Technology (*Denkai Gijutsu Touronkai—Soda Kougyou Gijutsu Touronkai Youshishu*), pp. 1-4" states that when an electrolysis test is performed using a conductive diamond film formed on a silicon substrate or niobium substrate, a diamond electrode may not have adequate durability due to separation of the diamond film or corrosive wear of the substrate, depending on the solution or electrolysis conditions.

The important points for a diamond electrode are that a large surface area can be coated with diamond, and that the electrical resistance of a diamond layer is reduced for the sake of electrical efficiency of the electrode, that is, that boron is doped in a large quantity. Also, in the formation of a conductive diamond film as an electrode on a substrate with a large surface area, the film needs to have enough physical and chemical strength and adhesion to be able to withstand use in harsh environments of high current density and high potential, corrosive environments such as electrolytic corrosion, and separation caused by stress generated between the substrate and the conductive diamond.

In a method in which trimethyl borate is doped with a filament CVD, it has been indicated that doping a large quantity of boron makes the potential window smaller, so the doped amount cannot be raised. The same thing has been mentioned in Patent Document 2, which states that the doping a large quantity of boron adversely affects diamond film quality and prevents the properties inherent in diamond from being obtained. Thus, existing methods have had a number of problems in terms of stably producing low-resistance conductive diamond by doping a large quantity of boron to a diamond electrode with a large surface area, and making the substrate thereof sufficiently durable.

Patent Document 1: Japanese Patent Publication 2001-147211

Patent Document 2: Japanese Patent Publication H9-13188

Patent Document 3: Japanese Patent Publication 2000-313982

Non-Patent Document 1: Preprints of the 26th Committee of Electrolytic Science Technology, Committee of Soda Technology (*Denkai Gijutsu Touronkai—Soda Kougyou Gijutsu Touronkai Youshishu*)

DISCLOSURE OF THE INVENTION

Problems Which the Invention is Intended to Solve

It is an object of the present invention to provide a method for manufacturing a conductive diamond, especially a method for manufacturing a high-performance, high-durability electrode by sufficiently raising the anti-pealing-off strength during electrolysis and increasing adhesion between a diamond film and a substrate, and with which a diamond electrode with sufficiently low resistance can be obtained by increasing the amount of boron doped.

More specifically, it is an object of the present invention to provide a method for manufacturing a conductive diamond electrode, with which the coefficient of thermal expansion of the substrate material is kept within a limited range, stress between the diamond film and the substrate is reduced so as to achieve good adhesion, electrochemical film separation from the substrate during electrolysis is prevented by employing an insulating substrate, and, by adding nitrogen, tungsten, or tungsten carbide during diamond production simultaneously with an dopant such as boron for imparting conductivity, loss of the crystallinity of the diamond is prevented and a continuous and dense polycrystalline diamond film is obtained stably with the crystallinity of the diamond kept, and to provide a conductive diamond electrode obtained by this method.

Means Used to Solve the Above-Mentioned Problems

The electrode of the present invention, whose structure comprises a substrate and a diamond layer coating this substrate, is characterized in that a diamond-coated electrode comprising a substrate coated with diamond, wherein said diamond contains boron, and a concentration of said boron is at least 10,000 ppm and no more than 100,000 ppm.

Said boron-doped diamond may contain at least one member of the group consisting of nitrogen, tungsten, and tungsten carbide.

The nitrogen concentration in said diamond is preferably at least 1000 ppm and no more than 100,000 ppm.

The tungsten concentration in said diamond is preferably at least 1000 ppm and no more than 100,000 ppm.

The nitrogen concentration in said diamond is preferably at least 1000 ppm and no more than 100,000 ppm, and the tungsten concentration is preferably at least 1000 ppm and no more than 100,000 ppm.

The diamond is preferably polycrystalline CVD diamond.

Said polycrystalline CVD diamond is preferably produced by hot filament CVD.

The peak intensity of said diamond in the (111) direction in X-ray diffraction measurement is preferably at least 3 times and no more than 10 times the peak intensity in the (220) direction, and the peak intensity in the (220) direction is preferably at least 1.2 times the peak intensity in the (311) direction.

The full width at half maximum of the peak indicating the (111) direction in X-ray diffraction measurement of said diamond is preferably from 0.3 to 0.5.

The average intensity at 1300 to 1380 $cm^{-1}$ in Raman spectroscopic measurement of said diamond is preferably no more than 3 times the average intensity at 1100 to 1700 $cm^{-1}$.

Said substrate is preferably formed from an insulator.

The coefficient of thermal expansion of said substrate is preferably from $1.5 \times 10^{-6}$ to $8.0 \times 10^{-6}$.

The coefficient of thermal expansion of said substrate is more preferably from $2 \times 10^{-6}$ to $5.0 \times 10^{-6}$.

Preferably said substrate is formed from an insulator and has a coefficient of thermal expansion of from $1.5 \times 10^{-6}$ to $8.0 \times 10^{-6}$.

Said substrate is preferably made of at least one member of the group consisting of oxides, nitrides and carbides.

Said substrate is preferably a ceramic sintered body.

Said substrate is preferably made of at least one member of the group consisting of silicon nitride, silicon carbide, aluminum nitride, mullite and cordierite.

Said substrate is preferably made of at least one member of the group consisting of aluminum oxide, silicon oxide, and titanium oxide.

The surface roughness Ra of the diamond-coated surface of said substrate is preferably from 0.2 to 5.0 μm.

The forming and working of the surface of the ceramic sintered body to be coated with the diamond are preferably performed prior to the sintering of the ceramic sintered body, and preferably mechanical working is not performed after sintering.

The forming and working of the surface of the ceramic sintered body to be coated with the diamond are preferably performed after the sintering of the ceramic sintered body, and heat treatment is preferably performed again after sintering.

Said working is preferably milling, blasting or grinding.

Said working is preferably milling.

The thickness of said diamond is preferably at least 0.1 μm and no more than 20 μm.

The particle diameter of said diamond is preferably at least 0.1 μm and no more than 5 μm.

The above-mentioned diamond-coated electrode may be utilized to decompose a substance in a solution through an electrochemical reaction.

It is preferable to produce a conductive diamond electrode by a method, wherein a sample holder and a container filled with a liquid including boron and oxygen as elemental components are placed in a vacuum vessel, a tungsten filament is placed near the sample holder, a substrate is placed on the sample holder, the vacuum vessel is vacuum-evacuated, hydrogen and a gas serving as a carbon source are then introduced in a predetermined mix ratio until a predetermined pressure is achieved, a carrier gas is then introduced through an inlet to the container filled with a liquid including boron and oxygen as elemental components, a vapor of the solution including boron and oxygen as elemental components is introduced through an outlet into the vacuum vessel, an electric current is allowed to flow through said filament to produce heat, cooling efficiency is adjusted by water-cooling the sample holder or another such method, thereby bringing the substrate to a predetermined temperature, and a diamond film doped with at least boron is deposited on the surface of the substrate, and wherein a diameter of the filament is at least 0.1 mm and no more than 0.5 mm, the spacing between the filament and the substrate is at least 4 mm and no more than 10 mm, the gas pressure is at least 0.6 kPa and no more than 7 kPa, and a filament temperature is at least 2100° C. and no more than 2300° C.

Efffect of the Invention

Utilizing the present invention, in relation to a composite electrode comprising a substrate and a boron-doped conductive diamond film formed over this substrate, it comes to be possible to obtain an electrode with sufficiently low resistance, with good film adhesion between the diamond film and the substrate, and with good electrolysis anti-pealing-off strength, preferably by the substrate of an insulator, a coefficient of thermal expansion of from $1.5 \times 10^{-6}$ to $8.0 \times 10^{-6}$, and said boron doped in amount of from 10,000 to 100,000 ppm.

BEST MODE FOR CARRYING OUT THE INVENTION

Diamond is generally an insulating material, but it can be rendered conductive by doping an impurity such as boron. Methods for producing manmade diamond are broadly grouped into high temperature and pressure methods and vapor phase synthesis methods, and of the latter, CVD is generally used to obtain diamond of a large surface area. Plasma CVD, hot filament CVD, plasma jet CVD and so forth are well known methods to obtain a diamond film with large surface area by vapor phase synthesis.

In hot filament CVD, a sample holder is placed in a diamond vacuum vessel, a tungsten filament is placed nearby, a substrate is placed on the sample holder, the vacuum vessel is vacuum-evacuated, and hydrogen and a gas serving as a carbon source are then introduced in a predetermined mix ratio until a predetermined pressure is achieved, after which an electric current is allowed to flow through said filament to produce heat, the cooling efficiency is adjusted by water-cooling the sample holder or another such method, thereby bringing the sample to a predetermined temperature, and a diamond film can be deposited on the surface of the sample.

When this method is used to obtain conductive diamond, boron should be doped. As a method to dope boron, there are techniques such as a simple method in which boric acid is placed near the sample and the filament, or a method by introducing diborane gas. However, a problem with the former is that it is difficult to dope a large quantity of boron while adjusting the quantity, and a problem with the latter is that it involves the use of a hazardous gas, so special safety precautions are required.

One way to stably dope a large amount of boron is to fill a container with a liquid including boron and oxygen (hereinafter referred to as "B source container"), and use this container as a bubbler to introduce the contents into a CVD vessel. The liquid including boron and oxygen in this case may be the product of dissolving boric acid in a solution of methanol and acetone, or may be trimethyl borate or triethyl borate. This method is that bubbling hydrogen or an inert gas such as argon as a carrier gas into the B source container adjusted to a suitable temperature evaporates the boron source in the container, and this vapor is introduced into a vacuum reaction vessel. After the evaporation, a flow meter can be installed along the pipe, which allows control of the flow of the mixed gas containing the boron source.

Boron-doped conductive diamond can be obtained by this method. With this method, however, under certain conditions a product which a large quantity of boron has been doped may turn into amorphous carbon, in which the diamond structure deforms. For instance, the diamond may turn into amorphous carbon in the case that the amount of doped boron is high concentrations of from 10,000 to 100,000 ppm. Since some states in which the film product is partially a diamond structure and partially amorphous carbon could arise and the quality of the diamond obtained varies depending on the manufacturing conditions, then it is sometimes impossible to obtain conductive diamond stably.

The inventors discovered that this problem was solved by adding nitrogen, tungsten, or tungsten carbide to the diamond. Doing this allows low-resistance conductive diamond doped with a large quantity of boron to be obtained stably, and controlling the film formation conditions in the process allows the drop in quality to be minimized, therefore, a dense, continuous film with a distinct diamond structure preserved can be obtained.

To obtain a diamond film with good quality and low enough electrical resistance by this method, it is preferable for the amount of boron doped in the diamond film to be from 10,000 to 100,000 ppm. It is also preferable for the amount of doped nitrogen to be from 1000 to 100,000 ppm, and for the amount of doped tungsten to be from 1000 to 100,000 ppm. Either nitrogen or tungsten may be doped in the above amounts, or both may be doped.

Doping just the above amount of boron to be doped can be accomplished by controlling the amount of added boron during synthesis. Doping just the above amount of nitrogen to be doped can be accomplished by allowing an extremely small amount of nitrogen to remain in the reaction vessel. If the boron is doped in the amount given above, then the nitrogen will naturally be doped in the amount given above, as long as it is a small amount.

Doping just the above amount of tungsten to be doped can be accomplished by using tungsten as the filament material, controlling the temperature during the reaction and adjusting the distance from the substrate. Preferably, the filament temperature during the reaction is from 2100 to 2300° C., and the substrate temperature is from 800 to 1100° C. The above-mentioned tungsten may be present in the form of tungsten carbide in the film. In this case, by keeping the substrate temperature to be between 900 and 1100° C., part of the tungsten in the film will remain as tungsten carbide.

Preferably the conductive diamond film is polycrystalline and the crystals in the film are oriented randomly rather than all facing in a specific direction. If the crystals all face in a specific direction, the doped amounts of boron, nitrogen, or tungsten may considerably fluctuate. More specifically, the peak intensity of the diamond in the (111) direction in X-ray diffraction measurement is preferably at least 3 times and no more than 10 times the peak intensity in the (220) direction, and the peak intensity in the (220) direction is preferably at least 1.2 times the peak intensity in the (311) direction. Also, the full width at half maximum of the peak indicating the (111) in X-ray diffraction measurement is preferably from 0.3 to 0.5.

When the diamond layer is measured by Raman spectroscopy, the average intensity at 1300 to 1380 $cm^{-1}$ is preferably no more than 3 times the average intensity at 1100 to 1700 $cm^{-1}$. A sharp diamond peak corresponds to less boron being doped, and actually results in higher resistance. When enough boron is doped, the peak in Raman spectroscopy will not be sharp even if the diamond has good crystallinity. The "good crystallinity" here means, for example, that the diamond crystals are distinctly euhedral, or that the diamond retains the characteristics of diamond, such as being chemically stable, having extremely high corrosion resistance, and having a broad potential window.

The thickness of said diamond layer is preferably from 0.1 to 20 μm, and the average particle diameter is preferably from 0.1 to 5 μm. If the film is too thin, some portions tend to be discontinuous, but if the film is too thick, there is greater stress, which leads to substrate warpage, film separation and the like. If the particle diameter is too small, crystallinity tends to suffer, but if the particle diameter is too large, unburied portions in the continuous film tend to show up.

The substrate to be coated by the conductive diamond film is preferably an electrical insulator. The term insulator as used here means that the resistivity is at least $10^6$ Ω·cm.

The coefficient of thermal expansion of this substrate is preferably from $1.5 \times 10^{-6}$ to $8.0 \times 10^{-6}$. The coefficient of thermal expansion here is the average value at 40-800° C. If the coefficient of thermal expansion is below this range, residual stress in the tensile direction will arise in the film when the substrate is coated with diamond, but if the coefficient is over this range, there will be residual stress in the compression direction, and the diamond film will split, separate, etc. after film formation or during an electrolysis test. It is even better for the coefficient of thermal expansion to be from $2.0 \times 10^{-6}$ to $5.0 \times 10^{-6}$.

The material of the insulating substrate is preferably made of at least one member of the group consisting of oxides, nitrides, and carbides. The material of said insulating substrate may be silicon nitride, silicon carbide, aluminum nitride, mullite, or cordierite. The material may also be aluminum oxide, silicon oxide, or titanium oxide, be electrically insulating, and have a coefficient of thermal expansion of $1.5\times10^{-6}$ to $8.0\times10^{-6}$.

Since the substrate temperature in film formation can reach nearly 1000° C., the properties generally required for a substrate on which a diamond film is to be formed are that the substrate be able to withstand the thermal stress between the substrate and the diamond film, and to have a high melting point; namely, the coefficient of thermal expansion of the substrate should not be too different from that of diamond. The substrate needs also to be made of a substance in which carbon scarcely diffuses, and needs to be hardly etched by hydrogen.

When it is used as an electrode in an electrochemical reaction, the substrate is preferably an insulator in order to improve anti-pealing-off strength of the diamond film from the substrate. If the substrate is conductive, the diamond film will separate as a result of the electrochemical effect on the substrate by liquid infiltrating from pinholes in the diamond film, gaps at the grain boundary and so on.

The above substrate materials are selected, as the substrate on which a low-resistance conductive diamond film doped with a high concentration of boron is formed, because of the generation of stress resulting from the doping of a large quantity of boron or the like, substrate adhesion and so forth as well as the properties discussed above.

These substrate materials preferably have a roughness Ra of the surface to be diamond-coated of 0.2 to 5.0 μm. If the substrate is smooth and has a low surface roughness, even when a substrate material that maintains good adhesion with an ordinary diamond film is used, separation may occur in the case that a conductive diamond film doped with a large quantity of boron is formed in the present invention. Consequently, it is preferable for the substrate surface to have the above-mentioned roughness in order to obtain good adhesion between the substrate and the diamond film.

When a ceramic sintered body is used as the substrate on which the diamond film is formed, it is preferable for the forming and working of the substrate's face on which the diamond film is layered to be performed prior to sintering, and for mechanical working not to be performed after sintering. By working after sintering, stress can remain on the substrate surface, and this stress is one of the factors leading to decreased adhesion between the substrate and the diamond film. When working is performed after sintering, it is preferable to perform heat treatment again after working. This removes the above-mentioned residual stress and eliminates the adverse effect of decreased adhesion.

There are no particular restrictions on the method for working the surface of the ceramic substrate prior to sintering, but milling, blasting or grinding is preferable. Regardless of the working method, the surface roughness can be controlled by selecting the conditions, allowing the adhesion with the diamond film to be controlled. In particular, although milling the surface of the ceramic after sintering is difficult, milling before sintering allows periodic bumps to be processed accurately on the substrate surface, and specific surface shapes can be obtained that would be very difficult by the other two methods, and it is sometimes particularly effective at enhancing adhesion with the diamond film.

EXAMPLE 1

Figure 1:
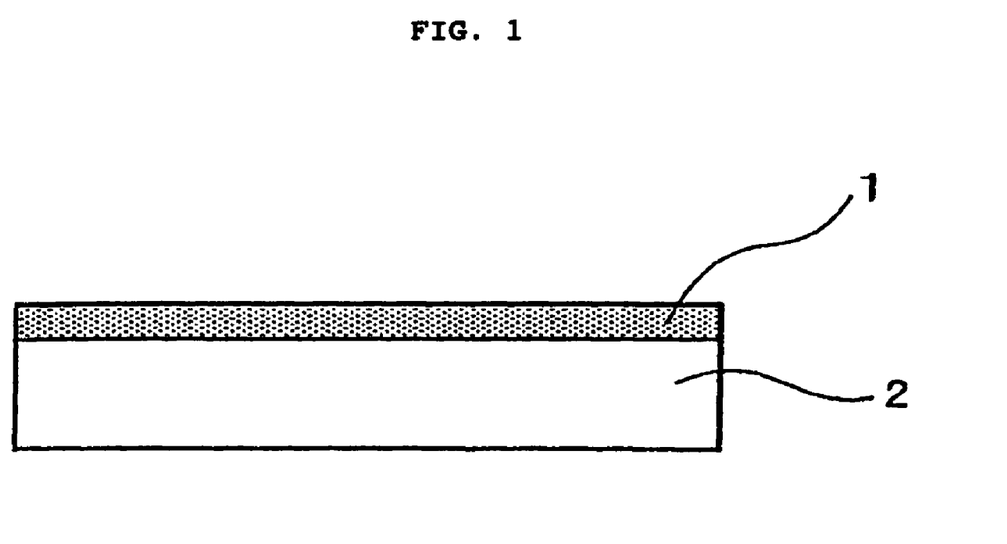
FIG. 1 This is an example of the structure of the diamond-coated electrode of the present invention.

Substrates of the size and material shown in Table 1 were used as a base material, and the surface thereof was scratched with diamond powder and then washed. Each of these substrates was placed in the synthesis apparatus shown in Table 1, and conductive diamond 1 was synthesized on the base material 2 as shown in FIG. 1.

As shown in Table 1-1, the synthesis was conducted at a gas pressure of 2.7 kPa or 7 kPa, a hydrogen flow of 5000 sccm, and a methane ($CH_4$) flow range of 0.5 to 2.0 sccm. Triethyl borate $[B(OC_2O_5)_3]$ was used as a boron source. Argon gas was bubbled in as a carrier gas, and boron was supplied at a concentration range of 0.2 to 1.0% in atomic ratio with respect to carbon. The temperature of the substrate that is a base material was between 700 and 1000° C.

When the synthesis apparatus was a hot filament CVD apparatus (HFCVD), the filament was made of tungsten and the filament temperature was between 2000 and 2200° C. When the synthesis apparatus was a microwave plasma CVD apparatus (MPCVD), the microwave frequency was 2.45 GHz and the microwave output was 5 kW. The synthesis time was 4 hours, and the methane flow and the concentration of diborane gas were varied so as to vary the thickness of diamond as shown in Table 1-1.

After the diamond was synthesized, it was taken out of the apparatus and observed under a 100-power stereomicroscope to check whether diamond separation occurred or not and whether diamond had been synthesized over the entire substrate. As a result, samples with no separation and samples that didn't have no synthesized portion are indicated by ○ in Table 1-1, while those otherwise are indicated by X.

Each of the resulting diamond films was examined for appearance, measured for electrical resistance, observed by SEM, and subjected to a simple electrolysis test as an electrochemical evaluation. The electrolysis test conditions were as follows: first, a test was conducted for 2 hours using a 0.1M sulfuric acid solution, at an electric current density of 0.1 A/cm², and using the same type of electrode for both electrodes (Electrolysis Test 1); after this, a test was conducted for 10 hours using a sulfuric acid solution at an electric current density of 1.0 A/cm² (Electrolysis Test 2). The results are shown in Table 1.

TABLE 1-1

| Smpl. No. | Substrate material | Structure | Substrate size | Substrate electrical conductivity | Film formation means | Diamond film thickness | Particle diameter | Separation after film formation | Stereomic. after elec. test 1[*1] | Separation after elec. test 1[*2] | Separation after elec. test 2[*2] |
|---|---|---|---|---|---|---|---|---|---|---|---|
| 1-1 | $SiO_2$ | amorphous | 50 × 50 × 2 | >$10^{14}$ | MP | 2.3 | 0.32 | ○ | ○ | ○ | X |
| 1-2 | $Si_3N_4$ | polycrystalline | 50 × 50 × 2 | >$10^{14}$ | HF | 5.2 | 0.76 | ○ | ○ | ○ | ○ |
| 1-3 | SiC | polycrystalline | 50 × 50 × 2 | $10^8$ | HF | 9.2 | 1.1 | ○ | ○ | ○ | ○ |
| 1-4 | $Si_3N_4$ | polycrystalline | 50 × 50 × 2 | >$10^{14}$ | HF | 4.1 | 0.65 | ○ | ○ | ○ | ○ |
| 1-5 | AlN | polycrystalline | 50 × 50 × 2 | >$10^{14}$ | HF | 3.6 | 0.52 | ○ | ○ | ○ | ○ |
| 1-6 | $Al_2O_3$ | polycrystalline | 50 × 50 × 2 | >$10^{14}$ | HF | 1.2 | 0.11 | ○ | ○ | ○ | X |
| 1-7 | AlN | monocrystalline | 10 × 10 × 3 | >$10^{14}$ | MP | 6.5 | 0.59 | ○ | ○ | ○ | X |

TABLE 1-1-continued

| Smpl. No. | Substrate material | Structure | Substrate size | Substrate electrical conductivity | Film formation means | Diamond film thickness | Particle diameter | Separation after film formation | Stereomic. after elec. test 1*[1] | Separation after elec. test 1*[2] | Separation after elec. test 2*[2] |
|---|---|---|---|---|---|---|---|---|---|---|---|
| 1-8 | SiO$_2$ | monocrystalline | 10 × 10 × 3 | >10$^{14}$ | HF | 19.3 | 1.87 | ○ | ○ | ○ | X |
| 1-9 | SiC | monocrystalline | 10 × 10 × 3 | 10$^8$ | MP | 4.2 | 0.39 | ○ | ○ | ○ | X |
| 1-10 | SiO$_2$ | amorphous | 500 × 250 × 3 | >10$^{14}$ | HF | 3.6 | 0.31 | ○ | ○ | ○ | X |
| 1-11 | Si | polycrystalline | 50 × 50 × 2 | 10$^2$ | HF | 3.1 | 0.39 | ○ | X | X | — |
| 1-12 | Si | monocrystalline | 50 × 50 × 2 | 10$^{-1}$ | HF | 2.9 | 0.23 | ○ | X | X | — |
| 1-13 | Mo | monocrystalline | 50 × 50 × 2 | 10$^{-8}$ | HF | 4.1 | 0.46 | ○ | X | X | — |
| 1-14 | SiO$_2$ | amorphous | 10 × 10 × 1 | >10$^{14}$ | HF | 21.2 | 2.3 | X | — | — | — |
| 1-15 | SiO$_2$ | amorphous | 10 × 10 × 1 | >10$^{14}$ | HF | 19.1 | 1.8 | ○ | X | X | — |
| 1-16 | SiO$_2$ | amorphous | 10 × 10 × 1 | >10$^{14}$ | MP | 0.14 | 0.019 | ○ | X | X | — |
| 1-17 | SiO$_2$ | amorphous | 10 × 10 × 1 | >10$^{14}$ | MP | 0.06 | 0.007 | X | — | — | — |
| 1-18 | Si$_3$N$_4$ | polycrystalline | 50 × 50 × 2 | >10$^{14}$ | HF | 18.9 | 4.8 | ○ | ○ | ○ | ○ |
| 1-19 | Si$_3$N$_4$ | polycrystalline | 50 × 50 × 2 | >10$^{14}$ | HF | 14.9 | 5.2 | ○ | X | ○ | X |
| 1-20 | Si$_3$N$_4$ | polycrystalline | 50 × 50 × 2 | >10$^{14}$ | HF | 20.8 | 4.1 | ○ | X | ○ | X |

*[1]Stereomicroscope evaluation after Electrolysis Test 1
*[2]Separation after Electrolysis Test 1
*[3]Separation after Electrolysis Test 2

TABLE 1-2

| Smpl. No. | B amount | W amount | N amount | Resistance (×10$^{-3}$) | Potential window | Appearance | Filament diameter | Filament temp. | Pressure (kpa) | F-Substrate distance | Substrate Ra |
|---|---|---|---|---|---|---|---|---|---|---|---|
| 1-1 | 1800 | — | — | 11.3 | 3.1 | | — | — | 7 | — | 1.7 |
| 1-2 | 16,000 | 2100 | 1900 | 4.7 | 3.1 | diamond euhedral | 0.25 ø | 2150 | 2.7 | 10 | 0.3 |
| 1-3 | 36,000 | 14,000 | 5300 | 2.9 | 3.1 | diamond euhedral | 0.25 ø | 2150 | 2.7 | 10 | 1.9 |
| 1-4 | 24,000 | 600 | 1800 | 4.3 | 3.1 | diamond euhedral | 0.25 ø | 2150 | 2.7 | 10 | 2.3 |
| 1-5 | 35,000 | 1700 | 800 | 4.5 | 3.1 | diamond euhedral | 0.25 ø | 2150 | 2.7 | 10 | 2.9 |
| 1-6 | 29,000 | 17,000 | 2800 | 3.1 | 3.1 | diamond euhedral | 0.25 ø | 2150 | 2.7 | 10 | 1.1 |
| 1-7 | 42,000 | — | — | 3.8 | 2.4 | amorphous | — | — | 7 | — | 1.2 |
| 1-8 | 31,000 | 2800 | 2900 | 9.7 | | diamond euhedral | 0.25 ø | 2150 | 2.7 | 10 | 1.5 |
| 1-9 | 1600 | — | — | 240 | 3.1 | diamond euhedral | — | — | 7 | — | 1.9 |
| 1-10 | 18,000 | 1600 | 2800 | 4.1 | 3.1 | diamond euhedral | 0.25 ø | 2150 | 2.7 | 10 | 1.1 |
| 1-11 | 46,000 | 6100 | 2700 | 2.9 | 3.1 | diamond euhedral | 0.25 ø | 2150 | 2.7 | 10 | 0.5 |
| 1-12 | 39,000 | 2700 | 1600 | 3.3 | 3.1 | diamond euhedral | 0.25 ø | 2150 | 2.7 | 10 | 0.7 |
| 1-13 | 68,000 | 3900 | 4200 | 3.7 | 3.1 | diamond euhedral | 0.25 ø | 2150 | 2.7 | 10 | 0.9 |
| 1-14 | 18,000 | 6700 | 8100 | 2.1 | — | poor film formation | 0.25 ø | 2150 | 2.7 | 10 | 1.2 |
| 1-15 | 29,000 | 2900 | 1600 | 2.9 | 3.1 | diamond euhedral | 0.25 ø | 2150 | 2.7 | 10 | 1.4 |
| 1-16 | 1500 | — | — | 310 | 3.1 | diamond euhedral | — | — | 7 | — | 0.9 |
| 1-17 | 1300 | — | — | 290 | — | poor film formation | — | — | 7 | — | 1.3 |
| 1-18 | 16,000 | 2100 | 1800 | 3.4 | 3.1 | diamond euhedral | 0.25 ø | 2150 | 2.7 | 10 | 4.7 |
| 1-19 | 13,000 | 2700 | 1500 | 4.2 | 3.1 | diamond euhedral | 0.25 ø | 2150 | 2.7 | 10 | 2.7 |
| 1-20 | 18,000 | 2400 | 1800 | 3.2 | 3.1 | diamond euhedral | 0.25 ø | 2150 | 2.7 | 10 | 2.1 |

It can be seen from Table 1 that separation of diamond occurred when the thickness of the conductive diamond was over 20 μm. Also, conductive diamond was not able to be synthesized over the entire surface of the base material when the thickness of the conductive diamond was less than 0.1 μm. Furthermore, when the base material was a conductive substance with a resistivity of less than 10$^6$ Ω·cm, holes were observed in the conductive diamond and the diamond separated after Electrolysis Test 1 was conducted.

In contrast, when the base material was an insulating substance with a resistivity of at least 10$^6$ Ω·cm, no holes were observed in the conductive diamond and the diamond did not separate, at least immediately after Electrolysis Test 1.

Diamond synthesized in the vapor phase is usually polycrystalline. It is preferable for the diameter of the diamond particles on the outermost diamond surface to be at least 0.01 μm and no more than 2 μm. If the size is smaller than 0.01 μm, it will be difficult to form over the entire surface and crystallinity decreases, just as when the film is too thin. If the particles are larger than 2 μm, though, holes and cracks can develop among the diamond particles, leading to subsequent separation. Separation and cracking will occur. The particle diameter of the diamond particles can be controlled by controlling the nucleation density of the diamond by means of a pretreatment of the film formation or the concentration of the methane or other carbon-containing gas, or by the subsequent growth conditions.

EXAMPLE 2

Substrates of the various types and in the states of working shown in Table 2-1 were subjected to seeding with diamond powder in advance, after which a hot filament CVD apparatus was used to form a diamond film on each under several varieties of formation conditions (sample Nos. 2-1 to 2-20). The size of each substrate was 60 mm square and the thickness was 2 mm. The coefficient of thermal expansion of each substrate was the average coefficient of thermal expansion within 40-800° C. The gases used here were introduced into the apparatus by bubbling argon through a bubbler, which was filled with $H_2$, $CH_4$ and trimethyl borate $[B(OC_2O_5)_3]$ as a boron source.

The common conditions were kinds of gases, an $H_2$ flow of 1000 sccm, a $CH_4$ flow of 20 sccm, and an $Ar+B(OCH_3)_3$ flow of 5 sccm, the use of a tungsten filament with a diameter of 0.2 mm, a filament temperature of 2200° C., and a substrate-filament spacing of 5 mm. The substrate temperature was adjusted to within 600-950° C. by controlling the cooling efficiency of the sample holder.

Further, substrates of the various types and in the states of working shown in Table 2-2 were subjected to seeding with diamond powder in advance, after which a hot filament CVD apparatus was used to form a diamond film on each under several varieties of formation conditions (sample Nos. 2-21 to 2-32). The size of each substrate was 60 mm square and the thickness was 2 mm. The coefficient of thermal expansion of each substrate was the average coefficient of thermal expansion within 40-800° C. As for the gas introduced, suitable amounts of hydrogen and boric acid dissolved in a mixed solution of methanol and acetone was used, hydrogen gas was bubbled into the resulting liquid, and the gas thus generated was used as a carbon source and boron source. The raw material solution was controlled so that the ratio of carbon to boron in atomic ratio would be 100:1. The gas pressure during film formation was 3 kPa.

A tungsten wire with a diameter of 0.4 mm was used as the filament, the filament temperature was 2200 to 2300° C., and the substrate-filament spacing was 10 mm. The substrate temperature was regulated within 600-950° C. by controlling the cooling efficiency of the sample holder.

Each of the diamond films thus obtained was examined for appearance, measured for electrical resistance, observed by SEM, and, impurity concentrations in the films were measured by SIMS and the diamond films were subjected to a simple electrolysis test as an electrochemical evaluation. The dopant concentrations here were 15,000 to 25,000 ppm boron, 2000 to 3000 ppm tungsten, and 1000 to 2000 ppm nitrogen. The electrolysis test conditions were as follows: first, a test was conducted for 2 hours using a 0.1M sulfuric acid solution, at an electric current density of 0.1 A/cm², and using the same type of electrode for both electrodes (Electrolysis Test 1); after this, a test was conducted for 10 hours using a sulfuric acid solution, at an electric current density of 1.0 A/cm² (Electrolysis Test 2). The results are given in Table 2.

TABLE 2-1

| Smpl. No. | Substrate material | Coefficient of expansion ($\times 10^{-6}$) | Film thickness (μm) | Resistivity ($\Omega \cdot$ cm) | Structure | Surface roughness Ra (μm) | Working method | Film appearance | Resistance ($10^{-3}$ $\Omega \cdot$ cm) | SEM observation | Electrolysis Test 1 | Electrolysis Test 2 |
|---|---|---|---|---|---|---|---|---|---|---|---|---|
| 2-1 | Si | 3.8 | 3.6 | <$10^2$ | Monocrystalline | 1.2E−03 | mirror finishing | good | 8.7 | diamond euhedral | no separation | complete separation |
| 2-2 | Si | 3.8 | 4.1 | <$10^2$ | Polycrystalline | 0.23 | as-cut | good | 6.9 | diamond euhedral | no separation | complete separation |
| 2-3 | Mo | 5.1 | 3.9 | <$10^{-5}$ | Polycrystalline | 0.08 | lapping | good | 4.9 | diamond euhedral | partial separation | complete separation |
| 2-4 | Mo | 5.1 | 5.1 | <$10^{-5}$ | Monocrystalline | 2.3 | lapping | good | 5.9 | diamond euhedral | no separation | complete separation |
| 2-5 | W | 4.5 | 3.8 | <$10^{-5}$ | Monocrystalline | 1.3 | lapping | good | 3.9 | diamond euhedral | no separation | complete separation |
| 2-6 | W | 4.5 | 5.6 | <$10^{-5}$ | Polycrystalline | 7.3 | milling | Incomplete film growth | 3.9 | diamond euhedral | partial separation | complete separation |
| 2-7 | Nb | 7.1 | 4.6 | <$10^{-5}$ | Monocrystalline | 0.11 | lapping | good | 4.1 | diamond euhedral | Separation | — |
| 2-8 | Nb | 7.1 | 4.1 | <$10^{-5}$ | Monocrystalline | 3.6 | blasting | good | 5.6 | diamond euhedral | no separation | complete separation |
| 2-9 | quartz | 0.5 | 3.8 | >$10^{14}$ | Amorphous | 1.2 | blasting | good | 18.9 | diamond euhedral | no separation | complete separation |
| 2-10 | AlN | 5.4 | 3.1 | >$10^{14}$ | Sintered body | 2.6 | blasting after sintering | good | 16.2 | diamond euhedral | no separation | no separation |
| 2-11 | AlN | 5.4 | 7.8 | >$10^{14}$ | Sintered body | 3.1 | just milling before sintering | good | 16.5 | diamond euhedral | no separation | no separation |

TABLE 2-1-continued

| Smpl. No. | Substrate material | Coefficient of expansion (×10⁻⁶) | Film thickness (μm) | Resistivity (Ω·cm) | Structure | Surface roughness Ra (μm) | Working method | Film appearance | Resistance (10⁻³ Ω·cm) | SEM observation | Electrolysis Test 1 | Electrolysis Test 2 |
|---|---|---|---|---|---|---|---|---|---|---|---|---|
| 2-12 | AlN | 5.4 | 4.1 | >10¹⁴ | Sintered body | 1.1 | grinding after sintering | good | 18.8 | diamond euhedral | very little separation | partial separation |
| 2-13 | SiC | 4.6 | 8.9 | >10⁶ | Sintered body | 6.1 | blasting after sintering | Incomplete film growth | 17.9 | diamond euhedral | partial separation | partial separation |
| 2-14 | SiC | 4.6 | 19.1 | >10⁶ | Sintered body | 2.8 | blasting before sintering | good | 12.3 | diamond euhedral | no separation | no separation |
| 2-15 | SiC | 4.6 | 3.4 | >10⁶ | Sintered body | 0.31 | lapping after sintering | good | 11.9 | diamond euhedral | no separation | no separation |
| 2-16 | Si₃N₄ | 3.3 | 4.2 | >10¹⁴ | Sintered body | 3.6 | just milling before sintering | good | 12.3 | diamond euhedral | no separation | no separation |
| 2-17 | Si₃N₄ | 3.3 | 3.6 | >10¹⁴ | Sintered body | 2.9 | blasting after sintering | good | 11.8 | diamond euhedral | no separation | no separation |
| 2-18 | Si₃N₄ | 3.3 | 8.9 | >10¹⁴ | Sintered body | 0.19 | lapping after sintering | good | 31.1 | diamond euhedral | partial separation | partial separation |
| 2-19 | Fe | 13.5 | 3.4 | | metal crystal | 0.35 | | no film growth | — | — | — | — |
| 2-20 | SUS | | 3.1 | | metal crystal | 0.39 | | Separation | — | — | — | — |

TABLE 2-2

| Smpl. No. | Substrate material | Coefficient of expansion | Film thickness (μm) | Resistivity (Ω·m) | Structure | Surface roughness Ra (μm) | Working method | Film appearance | Resistance (10⁻³ Ω·cm) | SEM observation | Electrolysis Test 1 | Electrolysis Test 2 |
|---|---|---|---|---|---|---|---|---|---|---|---|---|
| 2-21 | quartz | 0.5 | 9.1 | >10¹⁴ | Amorphous | 2.5 | blasting | good | 16.5 | diamond euhedral | Separation | — |
| 2-22 | mullite | 4.8 | 4.3 | >10¹⁴ | Sintered body | 1.6 | sintering only | good | 21.1 | diamond euhedral | No separation | no separation |
| 2-23 | Cordierite | 1.4 | 3.9 | >10¹⁴ | Sintered body | 0.9 | grinding after sintering | good | 16.1 | diamond euhedral | partial separation | complete separation |
| 2-24 | Cordierite | 1.7 | 4 | >10¹⁴ | Sintered body | 1.1 | grinding after sintering | good | 17.1 | diamond euhedral | no separation | very little separation |
| 2-25 | Cordierite | 2.1 | 3.7 | >10¹⁴ | Sintered body | 1 | grinding after sintering | good | 16.5 | diamond euhedral | no separation | no separation |
| 2-26 | Steatite | 8.1 | 5.1 | >10¹⁴ | Sintered body | 0.7 | grinding after sintering | good | 13.9 | diamond euhedral | Separation | — |
| 2-27 | alumina | 8.2 | 3.6 | >10¹⁴ | Sintered body | 0.8 | grinding after sintering | good | 11.9 | diamond euhedral | Separation | — |
| 2-28 | alumina-silica | 7.8 | 4.2 | >10¹⁴ | Sintered body | 2.7 | sintering only | good | 14.6 | diamond euhedral | no separation | very little separation |
| 2-29 | alumina-silica titania | 7.7 | 3.9 | >10¹⁴ | Sintered body | 2.4 | sintering only | good | 12.8 | diamond euhedral | no separation | very little separation |
| 2-30 | alumina | 7.5 | 5.1 | >10¹⁴ | Sintered body | 1.3 | grinding after sintering | good | 11.9 | diamond euhedral | no separation | very little separation |
| 2-31 | SiC | 4.6 | 3.8 | <10³ | Sintered body | 1.1 | grinding after sintering | good | 16.1 | diamond euhedral | no separation | complete separation |
| 2-32 | SiC | 4.6 | 3.9 | <10⁻¹ | Sintered body | 1.4 | grinding after sintering | good | 15.3 | diamond euhedral | no separation | complete separation |

40-800° C. Average

It can be seen from Table 2 that when the surface roughness Ra was within 0.2 to 5.0, a good diamond film was formed on Si, Mo, tungsten, and Nb substrates and no separation of the diamond film occurred in the subsequent Electrolysis Test 1. Meanwhile, separation occurred when the surface roughness was outside this range, and separation occurred in every case in Electrolysis Test 2.

When resistivity and the coefficient of expansion were within the above ranges and surface roughness was over the above range, "partial separation" occurred in the electrolysis test. The "partial separation" referred to here includes very slight separation, and actually also includes cases of almost no degradation. In fact, with sample No. 2-13, for example, the surface roughness was high, only an extremely small portion of the film was not coated, and this portion was extremely difficult to distinguish from separated portions, so an evaluation of "partial separation" was made, but actually the separated portion showed no sign of expanding. It is therefore understood that resistivity and coefficient of thermal expansion play a major role in durability.

It can be seen from Tables 2-1 and 2-2 that no separation occurred in Electrolysis Test 1 or 2 when the substrate had a resistivity greater than $10^6$ Ω·cm, a surface roughness Ra was within the range of 0.2-5 μm and a coefficient of thermal expansion was within the range of 2.0-5.0. When a sample had the coefficient of thermal expansion outside the range of 2.0 to $5.0 \times 10^{-6}$ but inside 1.5 to $8.0 \times 10^{-6}$, no separation occurred in Electrolysis Test 1, and, complete separation did not occur although slight separation occurred in Electrolysis Test 2. When a sample had the coefficient of expansion outside the range of 1.5 to $8.0 \times 10^{-6}$, complete separation occurred in Electrolysis Test 2.

EXAMPLE 3

Another experiment was conducted by using the substrates in Example 2 (sample Nos. 2-11, 12, 14, 16, and 17) and changing the conditions of the electrolysis test. The electrolysis test was conducted under the conditions: for 1000 hours using a 0.1M sodium sulfuric acid solution, at an electric current density of 1.0 A/cm², and using the same type of electrode for both electrodes. The results are given in Table 3.

It can be seen from Table 3 that, with sample Nos. 2-12' and 2-17', which had the surface of a ceramic substrate worked after sintering, separation occurred in Example 3 that set the harsher conditions although no separation occurred in the electrolysis test of Example 2.

In contrast, no separation occurred in Nos. 2-11', 2-14' and 2-16', which had the surfaces worked prior to sintering, even in the electrolysis test of Example 3.

Also, when the same substrate as 2-17', which separated under the Example 3's conditions, was used and when the substrate was subjected to heat treatment for 1 hour at 1000° C. in a vacuum after working, no separation occurred even in the electrolysis test of Example 3.

When the same substrate as No. 2-1 was blasted and cut rather than milled prior to sintering, the result was nearly the same as when milling was performed, but the reproducibility of working was best when milling was performed.

TABLE 3

| Sample No. | Substrate material | Structure | Surface roughness Ra (μm) | Working method | Electrolysis test |
|---|---|---|---|---|---|
| 2-11' | AlN | sintered body | 3.1 | only milling before sintering | no separation |
| 2-12' | AlN | sintered body | 1.1 | grinding after sintering | very little separation |
| 2-14' | SiC | sintered body | 2.6 | only milling before sintering | no separation |
| 2-16' | $Si_3N_4$ | sintered body | 3.6 | only milling before sintering | no separation |
| 2-17' | $Si_3N_4$ | sintered body | 2.9 | blasting after sintering | very little separation |

EXAMPLE 4

Figure 2:
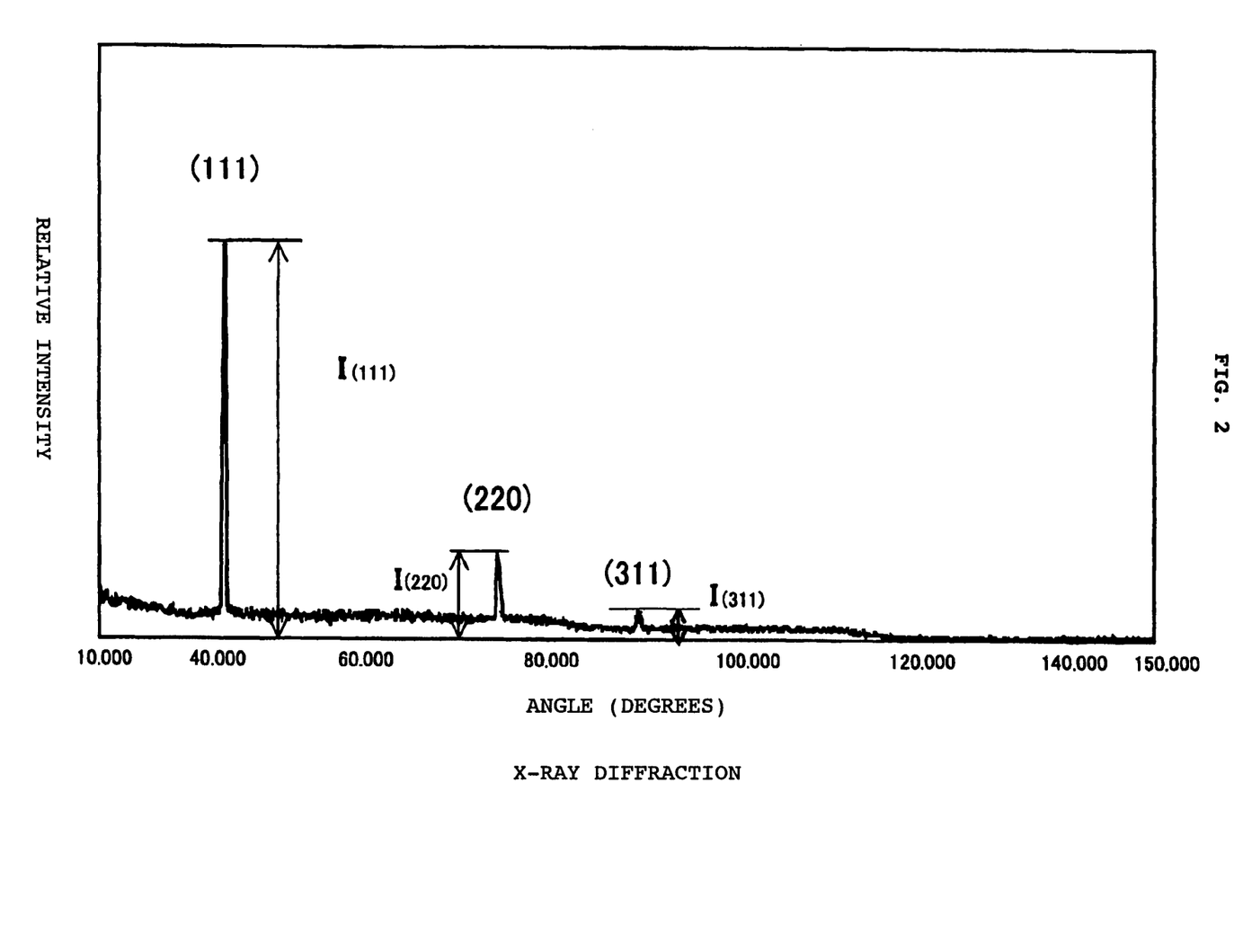
FIG. 2 This is a graph of the X-ray diffraction measurement result of the diamond layer.
Figure 3:
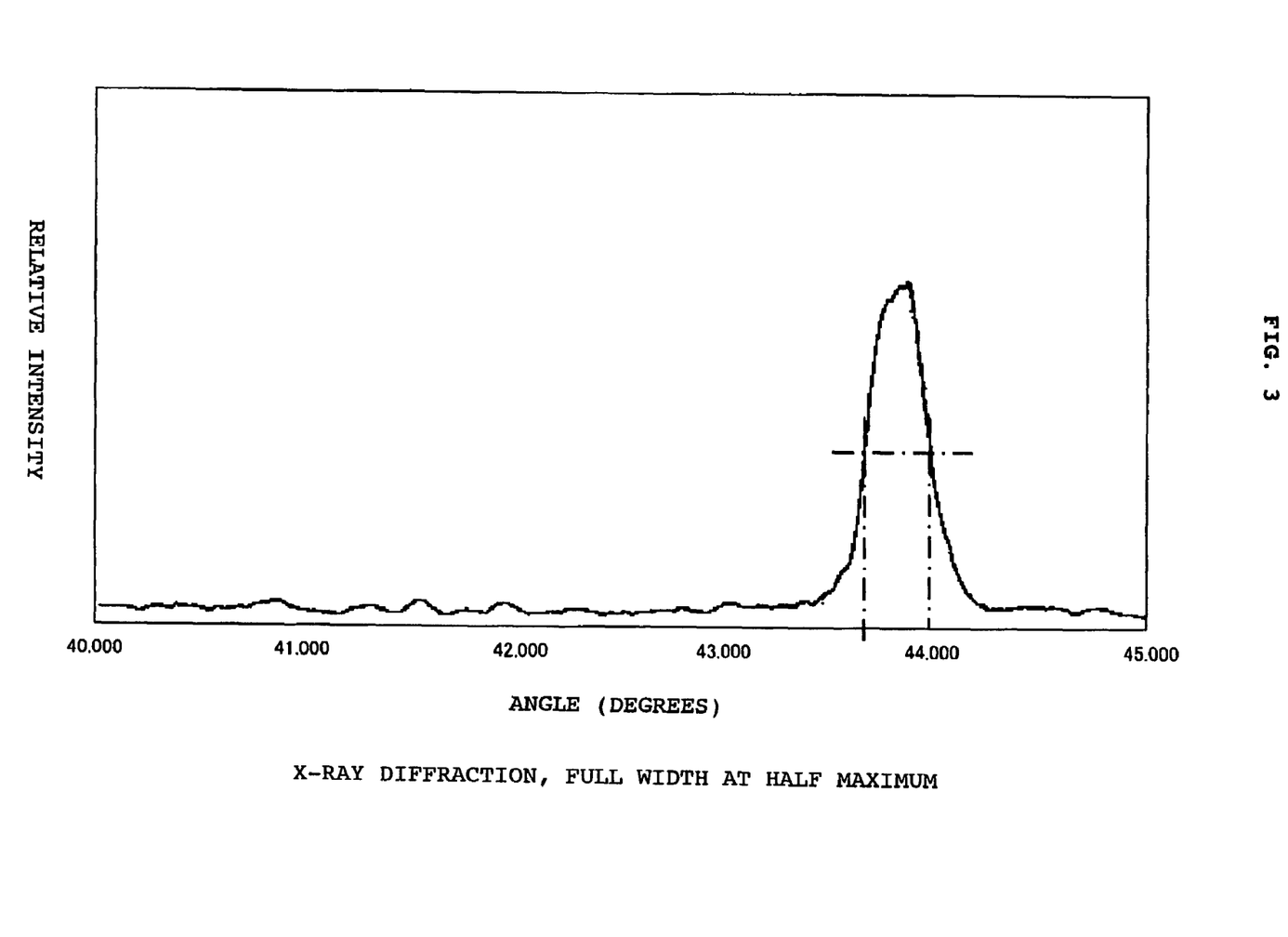
FIG. 3 This is a diagram to explain the full width at half maximum of X-ray diffraction.
Figure 4:
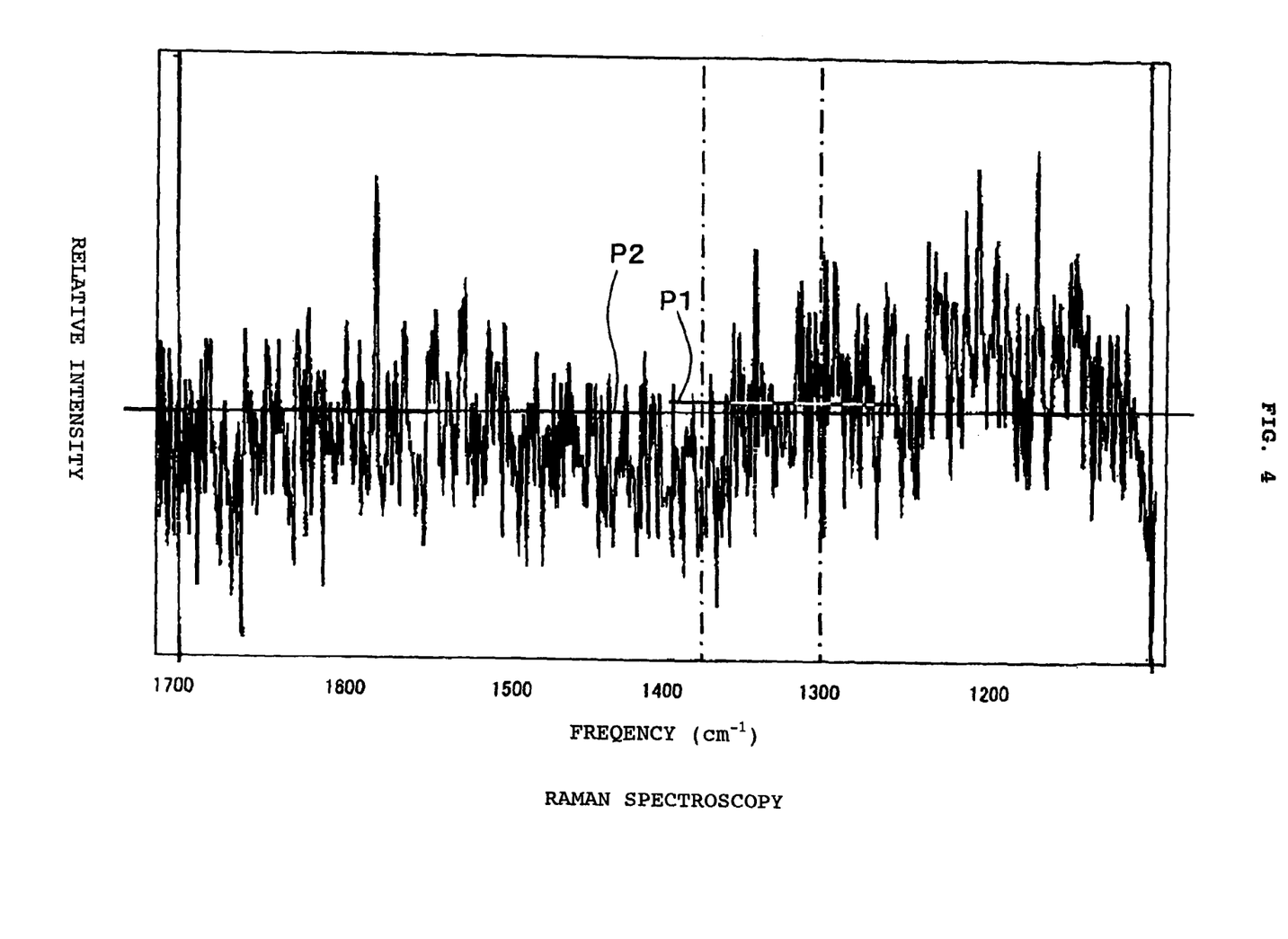
FIG. 4 This is a result of the results of Raman spectroscopic measurement of the diamond layer.

Sample No. 1-2 in Example 1 was subjected to X-ray diffraction and Raman spectroscopic measurement. FIGS. 2 and 3 show the results of X-ray diffraction. The ratio ($I_{(111)}/I_{(220)}$) of the (111) peak intensity (height) to the (220) peak intensity (height) was found from FIG. 2 to be 4.1. The ratio ($I_{(220)}/I_{(310)}$) of the (220) peak intensity (height) to the (311) peak intensity (height) was 1.5. The full width at half maximum of the (111) peak (hereinafter referred to as $FWHM_{(111)}$) was found from FIG. 3 to be 0.42. FIG. 3 shows the result of Raman spectroscopic measurement. The ratio (P1/P2) of the average intensity P1 at 1300 to 1380 cm$^{-1}$ to the average intensity P2 at 1100 to 1700 cm$^{-1}$ was found from FIG. 4 to be 1.3. Measurements were performed in the same way for sample Nos. 1-3 and 5. These results are given in Table 4 along with those for sample No. 2-21 in Example 2.

TABLE 4

| | X-ray diffraction | | | |
|---|---|---|---|---|
| Sample No. | $I_{(111)}/I_{(220)}$ | $I_{(220)}/I_{(310)}$ | $FWHM_{(111)}$ | Raman |
| 1-2 | 4.1 | 1.5 | 0.42 | 1.3 |
| 1-3 | 8.9 | 1.4 | 0.34 | 2.8 |
| 1-5 | 5.6 | 1.2 | 0.49 | 0.3 |
| 2-21 | 14.4 | — | 0.24 | 6.1 |

As shown in Table 4, sample Nos. 1-2, 3 and 5, whose amounts of boron were suitable, exhibited that the peak intensity in the (111) direction in X-ray diffraction was at least 3 times and no more than 10 times the peak intensity in the (220) direction, and the peak intensity in the (220) direction was at least 1.2 times the peak intensity in the (310) direction. The full width at half maximum of the peak in the (111) direction was within the range of 0.3-0.5. In contrast, as for sample No. 2-21, which contained little boron, the peak intensity in the (111) direction was more than 10 times the peak intensity in the (220) direction, and it was impossible to discern if there was a peak in the (310) direction. The full width at half maximum in the (111) direction was no more than 0.3.

The average intensities at 1300 to 1380 cm$^{-1}$ in Raman spectroscopic measurement of sample Nos. 1-2, 3 and 5, which contained a suitable amount of boron, were less than 3 times the average intensity at 1100 to 1700 cm$^{-1}$ but that of sample No. 2-21 was no less than 3 times.

EXAMPLE 5

The surface of the substrates shown in Table 5 was blasted with #60 alumina sand and then washed.

A conductive diamond layer was formed on each substrate mentioned above by hot filament CVD (HFCVD) or microwave CVD (MPCVD).

In synthesis by hot filament CVD, the gas pressure was 7 kPa, the hydrogen flow was 3000 sccm, and the methane flow was within the range of 0.5-5.0 sccm. Diborane gas was used as the boron source, and was supplied such that the concentration in the flow was within the range of 0.2-1.0% with respect to the methane. The temperature of the substrate was between 700 and 1000° C.

In the case of microwave CVD, the same pressure and flow rates were used, the microwave frequency was 2.4 GHz, and the microwave output was 5 kW.

The diamond films thus obtained each contained boron in a concentration range of 10,000 ppm-100,000 ppm.

As shown in Table 5, the film thickness and surface roughness were varied by changing the methane flow and diborane gas flow. A "○" indicates that there was no separation in electrolysis, and a "X" indicates that separation or substrate cracking occurred and electrolysis could not be continued. In this electrolysis, a diamond electrode was used for both the cathode and the anode in a container filled with a sulfuric acid aqueous solution of 1 mol/L. The electrodes were fixed 10 mm apart and power was applied thereto. The electrolysis was conducted for 100 hours at an electric current of 1.0 A/cm$^2$.

Separation occurred when the maximum height Rmax of the surface roughness of the sample's coating diamond layer was less than 0.1 μm. This sample was cut and the cross section was observed, which revealed gaps in the film. Similarly, separation occurred when the sample had an Rmax of over 20 μm, and observation again revealed that gaps had formed.

A sample in which the maximum height Rmax of the surface roughness of the substrate was over 10 μm was cut and the cross section was observed, which revealed that the film was not adhering in the deep recesses, forming gaps. Separation occurred when Rmax of the sample was less than 0.5 μm.

When the thickness of the diamond layer of a sample was less than 0.01 μm, the high resistance results in a large amount of heat being generated, and separation occurred as a result of thermal expansion of the diamond layer and the substrate. The sample that had the thickness of over 20 μm split substrate after film formation, and was not able to be used as an electrode. When the substrate was made from silicon oxide, separation of the film occurred during electrolysis.

EXAMPLE 6

Substrates of the various types shown in Table 6 were subjected to seeding with diamond powder in advance, after which a diamond film was formed by use of a hot filament CVD apparatus each under several varieties of formation conditions. The gases used here were $H_2$, $CH_4$, and, as a boron source, trimethyl borate $B(OCH_3)_3$, with which a bubbler was filled, and the gases were introduced into the apparatus by bubbling argon through the bubbler. Shared conditions were kinds of gases, an $H_2$ flow of 1000 sccm, a $CH_4$ flow of 20 sccm, and an $Ar+B(OCH_3)_3$ flow of 5 sccm, a gas pressure of 3 kPa, the use of a tungsten filament of 0.2 mm, a filament temperature of 2200, and a substrate-filament spacing of 5 mm. The substrate temperature was regulated between 600 and 950° C. by controlling the cooling efficiency of the sample holder. For Each of the diamond films thus obtained, electrical resistance was measured, and the amounts of boron and tungsten doped were

TABLE 5

| Sample No. | Film formation means | Substrate material | Surface roughness of film (Rmax μm) | Surface roughness of substrate (Rmax μm) | Film thickness (μm) | Separation |
|---|---|---|---|---|---|---|
| 5-1 | HFCVD | SiC | 8.4 | 7.6 | 3.8 | ○ |
| 5-2 | HFCVD | SiC | 0.01 | 3.2 | 5.1 | X |
| 5-3 | HFCVD | SiC | 0.09 | 5.3 | 9.1 | X |
| 5-4 | HFCVD | SiC | 20.2 | 8.2 | 10.2 | X |
| 5-5 | HFCVD | SiC | 30.2 | 6.4 | 5.7 | X |
| 5-6 | HFCVD | SiC | 7.6 | 0.03 | 8.6 | X |
| 5-7 | HFCVD | SiC | 6.8 | 0.49 | 3.5 | X |
| 5-8 | HFCVD | SiC | 8.2 | 10.2 | 7.5 | X |
| 5-9 | HFCVD | SiC | 7.2 | 19.2 | 4.8 | X |
| 5-10 | HFCVD | SiC | 3.6 | 4.9 | 0.001 | X |
| 5-11 | HFCVD | SiC | 9.7 | 6.8 | 0.011 | X |
| 5-12 | HFCVD | SiC | 8.4 | 5.9 | 20.1 | X |
| 5-13 | HFCVD | SiC | 5.3 | 9.1 | 30.2 | X |
| 5-14 | HFCVD | SiC | 0.48 | 18.9 | 0.008 | X |
| 5-15 | HFCVD | Mo | 4.5 | 7.8 | 5.6 | ○ |
| 5-16 | HFCVD | W | 7.2 | 4.6 | 8.1 | ○ |
| 5-17 | HFCVD | Ti | 4.2 | 7.3 | 2.3 | ○ |
| 5-18 | HFCVD | Ta | 8.2 | 3.2 | 4.3 | ○ |
| 5-19 | HFCVD | Nb | 9.2 | 5.4 | 3.2 | ○ |
| 5-20 | HFCVD | Si | 6.5 | 4.9 | 5.2 | ○ |
| 5-21 | HFCVD | $Si_3N_4$ | 7.2 | 5.3 | 4.6 | ○ |
| 5-22 | HFCVD | AlN | 5.9 | 4.6 | 3.8 | ○ |
| 5-23 | HFCVD | $Al_2O_3$ | 5.4 | 3.2 | 2.8 | ○ |
| 5-25 | MPCVD | SiC | 4.3 | 6.2 | 5.8 | ○ | measured by secondary ion mass spectrometry. The structure was observed by SEM, and the potential window was measured as an electrochemical evaluation. The results are given below.

TABLE 6

| Smpl. No. | Substrate material | Film appearance | B content | W content | Resistance ($\times 10^{-3}$ Ω·cm) | SEM observation | Potential window | Surface roughness Rmax (μm) |
|---|---|---|---|---|---|---|---|---|
| 6-1 | Si | good | 24,000 | 2100 | 8.7 | diamond euhedral | 3.1 | 0.52 |
| 6-2 | quartz | good | 28,000 | 1900 | 5.9 | diamond euhedral | 3.15 | 0.95 |
| 6-3 | SiC | good | 27,000 | 2400 | 11.2 | diamond euhedral | 3.1 | 2.1 |
| 6-4 | $Si_3N_4$ | good | 19,000 | 1800 | 3.1 | diamond euhedral | 3.2 | 2.8 |
| 6-5 | AlN | good | 23,000 | 2000 | 6.9 | diamond euhedral | 3.2 | 3.9 |
| 6-6 | Mo | good | 20,000 | 2000 | 4.6 | diamond euhedral | 3.2 | 6.8 |
| 6-7 | W | good | 19,000 | 2050 | 5.9 | diamond euhedral | 3.15 | 5.9 |
| 6-8 | Nb | good | 21,000 | 1900 | 7.1 | diamond euhedral | 3.1 | 9.1 |
| 6-9 | Fe | Separation | — | — | — | — | — | — |
| 6-10 | SUS | Separation | — | — | — | — | — | — |
| 6-11 | Mo | Separation | — | — | — | — | — | 0.081 |
| 6-12 | Mo | some film formation failed | — | — | — | some film formation failed | — | 11.3 |

It can be seen from the above results that the diamond films of samples 6-1 to 8, which were obtained by forming films by hot filament CVD on the substrates shown in Table 6, all exhibited good characteristics.

EXAMPLE 7

Conductive diamond films of samples 7-1 to 7-5 were produced using several kinds of manufacturing methods and substrates as shown in Table 7. Microwave plasma CVD and hot filament CVD were used as the method for the diamond film formation. Boron was used as a dopant. Conductive polycrystalline diamond films were formed on polycrystalline silicon measuring 75 mm square as substrates (samples 7-1 to 7-3). For comparison, conductive diamond epitaxial films were formed on monocrystalline Ib diamond measuring 5 mm square (samples 7-4 and 7-5.).

The common conditions that were used in the formation of the diamond films were a pressure of 2.66 kPa, the use of hydrogen, methane, and Ar+trimethyl borate as the introduced gases, and its mix ratio (volumetric ratio) of 1000:20:1 to 20. That is, the proportion of methane was 2 volume parts per 100 volume parts of hydrogen, and the proportion of Ar+trimethyl borate with respect to methane was from 5 to 100 volume parts. The trimethyl borate was introduced into the apparatus by bubbling argon into a container filled with liquid trimethyl borate. The substrate temperature was 800° C. The plasma CVD condition was at a power level of 5 kW, and the hot filament CVD conditions were the use of a tungsten filament with a diameter of 0.2 mm, a filament temperature of 2200° C., and a substrate-filament spacing of 5 mm.

Each of the diamond films thus obtained was measured for the amount of boron and tungsten doped. Secondary ion mass spectrometry was used for this measurement. The electrical resistance of the diamond films was also measured. The size of the substrates used in samples 7-1 to 7-3 (75 mm square) was the size of the electrodes used in the electrolysis apparatus used here. Finally, the potential window was measured. In measuring the potential window, the outer periphery was coated with an insulating resin, and the electrode exposed area was set at 50 mm square.

TABLE 7

| Smpl. No. | Producing method | Dopant | Substrate | B content (ppm) | W Content (ppm) | Resistance ($\times 10^{-3}$ Ω·cm) | Diamond film appearance | Potential window (V) |
|---|---|---|---|---|---|---|---|---|
| 7-1 | Heat filament CVD | B | Si | 25,000 | 3000 | 1.4 | entirely uniform | 3.2 |
| 7-2 | plasma CVD | B | Si | 2000 | <DL | 700 | poor film formation at corners | 3.1 |
| 7-3 | plasma CVD | B | Si | 40,000 | <DL | 12 | poor film formation at corners | 2.4 |

TABLE 7-continued

| Smpl. No. | Producing method | Dopant | Substrate | B content (ppm) | W Content (ppm) | Resistance ($\times 10^{-3}$ $\Omega \cdot$ cm) | Diamond film appearance | Potential window (V) |
|---|---|---|---|---|---|---|---|---|
| 7-4 | Heat filament CVD | B | Monocrystalline diamond Ib | 4000 | 1200 | 89 | entirely uniform | 3.1 |
| 7-5 | plasma CVD | B | Monocrystalline diamond Ib | 2000 | <DL | 68 | entirely uniform | 3.1 |

[<DL: below the detection limit]

In sample 7-1, in which boron was doped by use of hot filament CVD, the amounts of boron and tungsten doped were large, the electrical resistance was low, and the potential window was wide. In contrast, about samples 7-2 and 7-3, which used plasma CVD, the potential window of 7-2 with a smaller amount of boron doped was wide, but the potential window of 7-3 with a larger amount doped was narrower. The reason for this is understood that the crystal structure of the diamond deformed by doping a large amount of boron.

As for sample 7-1, in which the film was formed by hot filament CVD and a silicon substrate was used, the film was formed uniformly over the entire 75 square millimeters. But, in samples 7-2 and 8-3, in which the film were formed by plasma CVD, film formation was poor at the corners of the substrate. About samples 7-4 and 7-5, in which the films were formed by boron-doped epitaxial growth on a monocrystalline substrate, the potential window was wide and the inherent properties of diamond were preserved, but, of course the large substrate size of 75 mm square could not be accommodated and the electrical resistance was also higher than that in 7-1.

EXAMPLE 8

A monocrystalline Si (100) substrate with a diameter of 100 mm, a thickness of 2 mm, and a surface roughness Rmax of 0.41 μm was subjected to a scratch treatment using diamond powder, which made microscopic scratches on the surface and thereby seeded the surface. Diamond films were formed on these substrates by use of a filament CVD apparatus and under the several varieties of film formation conditions shown in Table 8. The gases used here were $H_2$, $CH_4$ and trimethyl borate ($B(OCH_3)_3$) as a boron source, which filled a bubbler, and the gases were introduced into the apparatus by bubbling argon through the bubbler. The common conditions were an $H_2$ flow of 1000 sccm, a $CH_4$ flow of 20 sccm, and an $Ar+B(OCH_3)_3$ flow of 5 sccm.

Several kinds of samples were obtained by changing the film formation conditions such as filament diameter and filament-substrate spacing. The substrate temperature was regulated within 600-950° C. by controlling the cooling efficiency of the sample holder. Each of the diamond samples thus obtained was observed for structure by SEM, and the potential window was measured as an electrochemical evaluation. The results are given below.

TABLE 8

| Sample No. | Filament diameter (mm) | Filament temp. (° C.) | Pressure (Torr) | Filament-substrate spacing | B content (ppm) | W content (ppm) | SEM observation | Potential window (V) | Resistance ($\times 10^{-3}$ $\Omega \cdot$ cm) |
|---|---|---|---|---|---|---|---|---|---|
| 8-1 | 0.1 | 2150 | 1.33 | 8 | 20,000 | 2000 | diamond euhedral | 3.1 | 8.7 |
| 8-2 | 0.25 | 2200 | 2.0 | 6 | 10,000 | 8000 | diamond euhedral | 3.15 | 5.9 |
| 8-3 | 0.4 | 2100 | 4.0 | 10 | 1000 | 100 | diamond euhedral | 3.1 | 11.2 |
| 8-4 | 0.3 | 2300 | 2.66 | 4 | 100,000 | 100,000 | diamond euhedral | 3.2 | 3.1 |
| 8-5 | 0.5 | 2150 | 3.33 | 20 | 12,000 | 6000 | diamond euhedral | 3.2 | 6.9 |
| 8-6 | 0.05 | 2100 | 3.33 | 20 | Film not deposited | — | — | — | |
| 8-7 | 0.3 | 2300 | 5.32 | 4 | 800 | 50 | diamond euhedral | 3.15 | 290 |
| 8-8 | 0.4 | 2200 | 1.06 | 4 | Large number of non-contiguous portions exist | | diamond euhedral | 2.7 | 160 |
| 8-9 | 0.25 | 2150 | 0.66 | 12 | 950 | 70 | diamond euhedral | 3.1 | 260 |
| 8-10 | 0.3 | 2100 | 0.66 | 3 | 2000 | 300 | amorphous | 2.5 | 6.9 |
| 8-11 | 0.3 | 2050 | 0.66 | 5 | 800 | 50 | diamond euhedral | 3.1 | 320 |
| 8-12 | 0.3 | 2350 | 0.66 | 5 | 6000 | 500 | amorphous | 2.1 | 4.6 |

EXAMPLE 9

A phenol-containing aqueous solution was subjected to an electrolysis test using the diamond-coated electrodes of sample No. 1-2 of Example 1 as that electrode. For comparison, the same electrolysis test was conducted using electrodes of platinum and lead oxide. As a result, when the diamond-coated electrodes were used, the total organic carbon (TOC) in the aqueous solution dropped to less than 10% in about 30% of the time needed for lead oxide electrodes. With the platinum electrodes, the TOC could not be reduced to about 30% regardless of the time. These results confirmed that the diamond-coated electrode of the present invention is capable of efficiently decomposing phenol.

INDUSTRIAL APPLICABILITY

As explained in detail above, with the method for manufacturing a conductive diamond electrode, a diamond electrode with sufficiently low resistance can be obtained by increasing the amount of doped boron. Moreover, by limiting the coefficient of thermal expansion of the substrate or by using an insulator as the substrate material, it will be possible to obtain a conductive diamond electrode with good adhesion between the diamond film and the substrate, and with sufficiently improved anti-peeling-off strength during electrolysis.

The invention claimed is:

1. A diamond-coated electrode, comprising:
   a substrate coated with diamond,
   wherein said diamond contains boron, and a concentration of said boron is at least 10,000 ppm and no more than 100,000 ppm,
   the boron-doped diamond contains at least one member of the group consisting of nitrogen, tungsten, and tungsten carbide, and
   a concentration of the nitrogen in the boron-doped diamond is at least 1000 ppm and no more than 100,000 ppm.

2. A diamond-coated electrode according to claim 1, wherein a concentration of the tungsten that is included in said diamond is at least 1000 ppm and no more than 100,000 ppm.

3. A diamond-coated electrode according to claim 1, wherein a concentration of the nitrogen that is included in said diamond is at least 1000 ppm and no more than 100,000 ppm, and the concentration of the tungsten is at least 1000 ppm and no more than 100,000 ppm.

4. A diamond-coated electrode according to claim 1, wherein said diamond is a polycrystalline CVD diamond.

5. A diamond-coated electrode according to claim 4, wherein said polycrystalline CVD diamond is produced by hot filament CVD.

6. A diamond-coated electrode according to claim 5, wherein a peak intensity of said diamond in (111) direction in X-ray diffraction measurement is at least 3 times and no more than 10 times a peak intensity in (220) direction, and the peak intensity in the (220) direction is at least 1.2 times a peak intensity in (311) direction.

7. A diamond-coated electrode according to claim 6, wherein a full width at half maximum of a peak indicating (111) direction in X-ray diffraction measurement of said diamond is from 0.3 to 0.5.

8. A diamond-coated electrode according to claim 7, wherein an average intensity at 1300 to 1380 $cm^{-1}$ in Raman spectroscopic measurement of said diamond is no more than 3 times an average intensity at 1100 to 1700 $cm^{-1}$.

9. A diamond-coated electrode according to claim 8, wherein said substrate is formed from an insulator.

10. A diamond-coated electrode according to claim 9, wherein a coefficient of thermal expansion of said substrate is from $1.5 \times 10^{-6}$ to $8.0 \times 10^{-6}$.

11. A diamond-coated electrode according to claim 10, wherein the coefficient of thermal expansion of said substrate is from $2 \times 10^{-6}$ to $5.0 \times 10^{-6}$.

12. A diamond-coated electrode according to claim 8, wherein said substrate is formed from an insulator and has a coefficient of thermal expansion of from $1.5 \times 10^{-6}$ to $8.0 \times 10^{-6}$.

13. A diamond-coated electrode according to claim 12, wherein said substrate is made of at least one member of the group consisting of oxides, nitrides and carbides.

14. A diamond-coated electrode according to claim 13, wherein said substrate is a ceramic sintered body.

15. A diamond-coated electrode according to claim 14, wherein said substrate is made of at least one member of the group consisting of silicon nitride, silicon carbide, aluminum nitride, mullite and cordierite.

16. A diamond-coated electrode according to claim 14, wherein said substrate is made of at least one member of the group consisting of aluminum oxide, silicon oxide, and titanium oxide.

17. A diamond-coated electrode according claim 16, wherein a surface roughness Ra of a surface of said substrate to be coated with the diamond is from 0.2 to 5.0 μm.

18. A diamond-coated electrode according to claim 17, wherein a forming and a working of a surface of said ceramic sintered body to be coated with the diamond are performed prior to a sintering of the ceramic sintered body, and a mechanical working is not performed after the sintering.

19. A diamond-coated electrode according to claim 17, wherein a forming and a working of a surface of said ceramic sintered body to be coated with the diamond are performed after a sintering of the ceramic sintered body, and a heat treatment is performed again after the working.

20. A diamond-coated electrode according to claim 19, wherein said working is milling, blasting or grinding.

21. A diamond-coated electrode according to claim 19, wherein said working is milling.

22. A diamond-coated electrode according to claim 21, wherein a thickness of said diamond is at least 0.1 μm and no more than 20 μm.

23. A diamond-coated electrode according to claim 22, wherein a particle diameter of said diamond is at least 0.1 μm and no more than 5 μm.

24. An electrolysis method using an electrode, wherein the diamond-coated electrode according to claim 1 is used to decompose a substance in a solution utilizing an electrochemical reaction.

25. A method for producing a diamond-coated electrode, wherein a sample holder and a container filled with a liquid including boron and oxygen as elemental components are placed in a vacuum vessel, a tungsten filament is placed near the sample holder, a substrate is placed on the sample holder, the vacuum vessel is vacuum-evacuated, hydrogen and a gas serving as a carbon source are then introduced in a predetermined mix ratio until a predetermined pressure is achieved, a carrier gas is then introduced through an inlet to the container filled with a liquid including boron and oxygen as elemental components, a vapor of the solution including boron and oxygen as elemental components is introduced through an outlet into said vacuum vessel, an electric current is allowed to flow through said filament to produce heat, cooling efficiency is adjusted by water-cooling the sample holder or another such method, thereby bringing said substrate to a predetermined temperature, and a diamond film doped with at least boron is deposited on a surface of the substrate, and wherein a diameter of the filament is at least 0.1 mm and no more than 0.5 mm, the spacing between the filament and the substrate is at least 4 mm and no more than 10 mm, the gas pressure is at least 0.6 kPa and no more than 7 kPa, and a filament temperature is at least 2100° C. and no more than 2300° C.

* * * * *